United States Patent
Bogue et al.

[15] 3,654,018
[45] Apr. 4, 1972

[54] BONDING SKIN TO CONCRETE

[72] Inventors: David L. Bogue, Pompano Beach; William E. Fisher, Jupiter, both of Fla.

[73] Assignee: KMS Industries, Inc., Ann Arbor, Mich.

[22] Filed: Feb. 11, 1970

[21] Appl. No.: 10,570

[52] U.S. Cl. ................156/245, 161/53, 161/119, 161/139, 264/257, 264/333
[51] Int. Cl. ................B28b 5/00, B32b 7/08, B32b 13/12
[58] Field of Search ................161/53, 120, 160, 162, 139, 161/119; 264/139, 257, 333; 156/242, 245

[56] References Cited

UNITED STATES PATENTS

| | | | |
|---|---|---|---|
| 2,805,448 | 9/1957 | Rubenstein | 264/139 X |
| 3,251,720 | 5/1966 | Goffin et al. | 156/73 |
| 3,533,896 | 10/1970 | Hartig | 161/69 X |
| 3,150,032 | 9/1964 | Rubenstein | 161/162 X |
| 3,399,425 | 9/1968 | Lemelson | 18/10 |
| 2,850,890 | 9/1958 | Rubenstein | 161/162 UX |
| 2,979,780 | 4/1961 | Gittins | 161/162 UX |
| 3,043,730 | 7/1962 | Adie | 161/161 X |
| 3,145,502 | 8/1964 | Rubenstein | 161/162 UX |

Primary Examiner—William A. Powell
Attorney—Barnes, Kisselle, Raisch & Choate

[57] ABSTRACT

A method of forming a solid structure to carry loads and have an attractive appearance which has a smooth and attractive outer surface formed as a fiber-included resin lay-up of a hard material having an inner surface with hooked projections provided by pulling material from the lay-up and allowing such to droop by gravity and thereafter depositing hardenable aggregate thereover to form an interlocking bond.

1 Claims, 5 Drawing Figures

Patented April 4, 1972
3,654,018
2 Sheets-Sheet 1
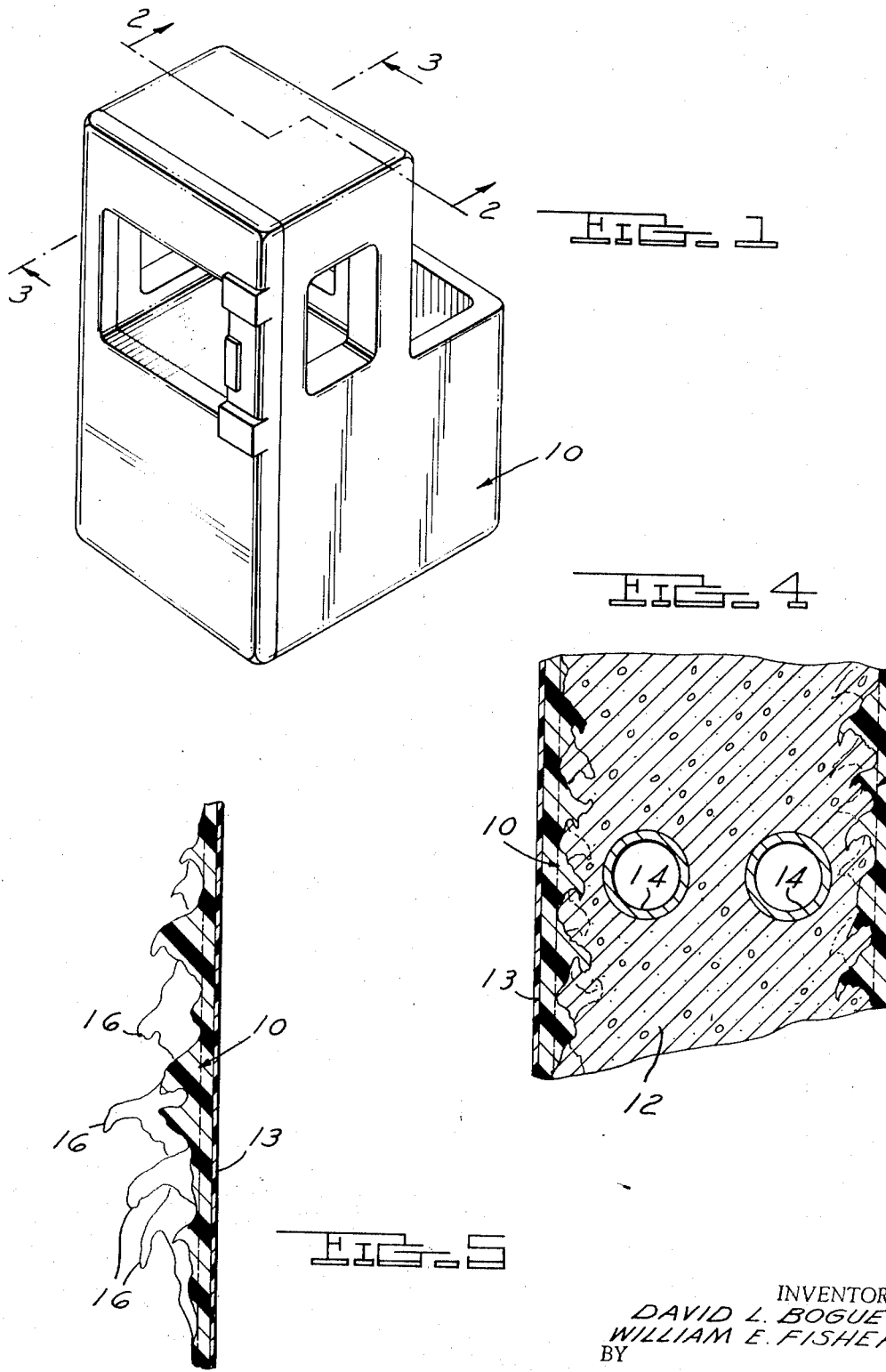
INVENTORS
DAVID L. BOGUE
WILLIAM E. FISHER
BY
Barnes, Kisselle, Raisch, & Choate
ATTORNEYS Patented April 4, 1972
3,654,018
2 Sheets-Sheet 2
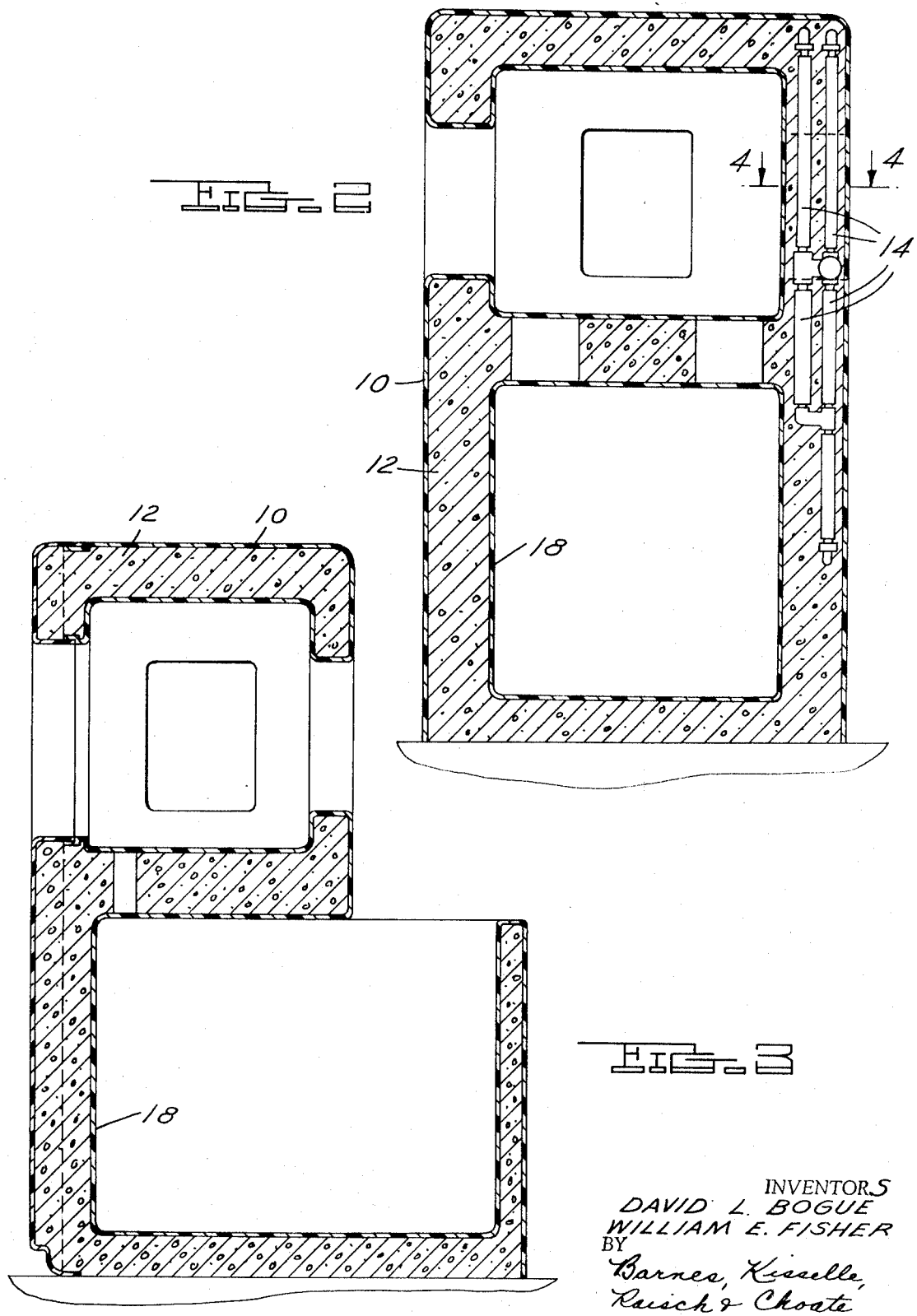
INVENTORS
DAVID L. BOGUE
WILLIAM E. FISHER
BY
Barnes, Kisselle,
Raisch & Choate
ATTORNEYS

BONDING SKIN TO CONCRETE

This invention relates to a Concrete Structure utilizing a glass reinforced plastic surface and to a method of forming the same. In the manufacture of structural elements which are to have strength and preferably weight and solidity, it is common to replace cast iron, for example, with a reinforced concrete. It is difficult, however, to obtain an attractive surface on concrete per se even when painted. It is hard to disguise the fact that it is concrete and it does not give the impression of a finished product even though it has all the structural characteristics necessary to perform its function.

It is an object of the present invention to provide a structural unit which is formed basically of concrete and which has an attractive finish wall which is smooth and neat in appearance.

It is a further object to provide a composite structure with a finish wall and concrete base wherein the two elements of the composite structure are locked together in a tight bond.

Other objects and features of the invention relating to details of construction will be apparent in the following description and claims in which the basic principles of the invention are set forth together with the best mode presently contemplated for the invention.

Drawings accompany the disclosure and the various views thereof may be briefly described as:

FIG. 1, a perspective view of a completed unit formed in accordance with the present invention.

FIG. 2, a section of the device shown in FIG. 1 illustrating the interior construction.

FIG. 3, a second sectional view of the construction of FIG. 1 taken on a plane extending from front to back of the unit.

FIG. 4, a sectional view on line 4—4 of FIG. 2.

FIG. 5, an enlarged view of a portion of the sheathing layer for the composite structure.

REFERRING TO THE DRAWINGS

In FIG. 1, a structure is shown which is particularly adapted for use as a machine tool base which requires a solid heavy base with rigidity in the entire structure. The invention is not limited to this type of structure since it may be used for any structural elements including such things as lawn furniture and the like, but its adaptability to machine tools will be evident in the following description.

The structures shown in FIGS. 1, 2 and 3 illustrate the outer surface 10 and the inner filler material 12 which is basically a concrete material formed of cement and aggregate.

It will be noted that certain conduit pipes 14, as shown in FIGS. 2 and 4, can be embedded in the filler material if this is desired and, on the other hand, it is possible to leave cavities for the purpose of projecting control wires and other control elements through spaces in the unit.

In FIG. 5, a sample of the outer sheath 10 is shown, and this is merely one wall of what can actually provide a mold for the filler or core material 12. The molds are prepared for the outer material and a conventional fiber-included resin shell is laid up in the mold. The smooth finish and desired color are provided by a resin gel coat 13 sprayed in the mold as a first step in a standard lay-up of a fiber-included resin such as Fiberglas (trademark).

A relatively thin resin shell 13 is used on the outside with a desired color and the final inside coat of resin in the lay-up is made heavily thixotropic. After its application, the inside coat is spanked with flat paddles which pull away conical projections of the resin which then droop back to form a multitude of tiny hooks on the inner surface of the lay-up. These are illustrated in FIG. 5 at 16.

When the device has an inner wall as shown in FIGS. 2 and 3 at 18, a cavity will be formed which can be filled entirely with a settable aggregate such as a concrete mix which will solidify in the usual time. The mix will merge intimately with the rough wall of the lay-ups and mechanically interlock so that when the aggregate has hardened the outer smooth decorative surface is firmly associated with the heavy, reinforcing core. It is preferable that the concrete is vibrated into the space between the shells during the time that the inner and outer shells are actually in the molds and the high strength concrete will then fill all the interstices to provide a very solid, dense and yet attractive product with a permanent color integral with the surface. The resulting product has the desired weight and structural strength particularly when a high strength concrete has been utilized as the filler material.

It will be recognized that other settable mixtures may be used in place of concrete. For example, certain products of the U.S. Gypsum Corporation, known by the trademarks "Ultra Cal 30", "Ultra Cal 60" and "Hydro Cal", can be utilized.

We claim:

1. A method of forming a composite structure which comprises:
   a. providing a mold in the shape of the desired structure,
   b. laying-up a glass fiber skin along the surfaces of said mold,
   c. forming hook-like projections on the inside surface of said skin by pulling projections from the material while thixotropic and allowing said projections to droop prior to setting by gravity to form hooks,
   d. depositing a relatively thick layer of hardenable aggregate on the inside of said skin to merge and interlock with said inside surface, and
   e. allowing said aggregate to harden into bond with said outer skin.

* * * * *